Jan. 12, 1932.    L. R. GRUSS    1,841,287
SHOCK ABSORBER
Filed April 12, 1930
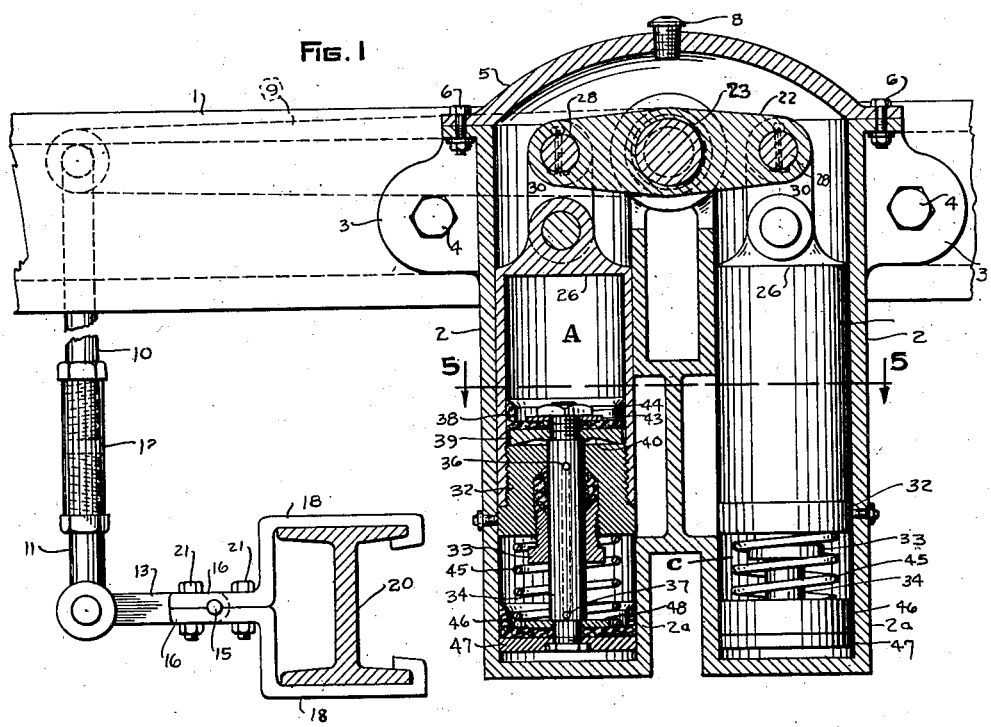
INVENTOR
LUCIEN R. GRUSS
BY John A. Bonnenhardt
ATTORNEY Patented Jan. 12, 1932

1,841,287

UNITED STATES PATENT OFFICE

LUCIEN R. GRUSS, OF CLEVELAND, OHIO

SHOCK ABSORBER

Application filed April 12, 1930. Serial No. 443,815.

This invention relates to shock absorbers and particularly to shock absorbers for vehicles, the device being of the pneumatic type.

The object of the invention is to provide an improved pneumatic shock absorber characterized particularly by means for maintaining the pressure in the compression chamber of the device at a suitable or desired amount, and which will provide a shock absorber free from sudden or irregular movements or jerks. The desired pressure is maintained automatically by the operation of the device.

In the form shown a duplex absorber appears, one unit being especially active on the compression of the vehicle spring and the other on the rebound.

In the form illustrated, Fig. 1 is a vertical section of the device. Fig. 2 is a similar view with the parts in different position. This figure also shows a modified form of gland in one of the units. Fig. 3 is a perspective view of a piston head. Fig. 4 is a detail in section of the modified gland shown in Fig. 2. Fig. 5 is a section on the line 5—5 of Fig. 1.

In the drawings, 1 indicates a side frame of a vehicle and 20 is the axle thereof. The shock absorber casing consists of a pair of guides 2, cylindrical base 2a fastened to the frame by ears 3 and bolts 4, with a cover 5 secured by bolts 6 and having an oil plug 8 if desired.

The axle 20 receives a pair of clamps 18 which are connected to a link 13 by a pivot 15 secured between the branches 16 of the clips 18 by bolts 21. This pivotal connection permits a certain amount of vibration of movement of the axle without operating the shock absorber. The link 16 is pivotally connected to the lower end of a rod 11 connected by a turnbuckle 12, for adjustment, to a rod 10, which is connected to the outer end of a lever 9 fastened on a stud shaft 23 which projects into the side of the casing and has a rocker 22 the opposite ends of which are connected by pivots 28 and links 30 to the upper ends of a pair of cylinders 26, which move up and down in opposite directions as the shock absorber functions.

The units are similar, and a description of one will answer for both. The cylinder 26 is hollow as shown, and is closed at the lower end by a cylinder head 32 which is tapped to receive a packing gland 33 through which works a piston rod 34. Fixed to the upper end of this rod, inside the cylinder 26, is a piston 39 provided with a cup leather 38 secured under a washer 43 and nut 44.

The under side of the piston 39 is concaved or cupped as shown at 40, to form a recess, the purpose of which is to trap or hold a certain amount of compressed air under the piston, as will be hereinafter described. The cup leather 38 is presented upwardly so that air may leak around it on the upward movement of the cylinder 26 but will be sealed on the downward movement.

At a distance below the piston head 32, the rod 34 is provided at its lower end with a piston head 47, having an upwardly presented cup leather 46 under a washer 48, and this piston works in the cylindrical end 2a of the guide 2. The rod 34 is provided with a longitudinal bore or passage terminating in upper and lower ports 36 and 37, the former of which is normally sealed in the gland 33, but may be uncovered by the downward movement of the cylinder 26 as shown at the left in Fig. 2, to open into a chamber between the under side of the head 32 and the piston 39. The lower port 37 is at all times in communication with the chamber between the head 32 and the lower piston 47.

The modified form of gland shown at the right hand unit in Fig. 2, and in Fig. 4, consists of a cylinder head 51 containing cup leather 52 pressed against the rod 34 by a coil spring 53 and a screw ring 54 tapped into the cylinder head. This is merely an optional form which may be substituted for the ordinary cylinder head 32.

A coiled spring 45 is placed between the piston head 32 and the cup leather 46, and may be used if necessary, to assist the motion of the floating piston comprising the rod 34 and the two heads 39 and 47.

In operation, it will be seen that by the construction described three chambers are produced, a main compression chamber A between the upper head of the floating piston and the top of the hollow cylinder; a chamber B, which is termed a vacuum chamber, between the head 39 and the main cylinder head 32; and a chamber C, also a compression chamber, between the head 32 and the lower head 47 on the floating piston. The parts being normally in the position shown in Fig. 1, when a rebound for example takes place the lever 9 swings to force down the left hand cylinder 26 and to raise the opposite cylinder 26, as shown in Fig. 2. The effect of this is to compress the air under the left hand cylinder 26, and when the piston head 47 reaches the bottom of the cylinder 2 the movement of the floating piston stops and the air in the chamber A is compressed to form an elastic cushion for the movement, the air being trapped in the chamber A by the cup leather 38. The chamber B thus becomes a vacuum chamber until the port 36 is uncovered which breaks the vacuum and permits air (and any entrained oil) to flow from the chamber C through the passage in the piston rod to the chamber B. At the same time the upward movement of the right hand cylinder 26 causes the air in the chamber B on that side to leak around the piston 39 and into the chamber A on that side, provided however that the air in the chamber A is at a lower pressure than that in the chamber B. The vacuum produced under the cylinder head 47 tends to produce this action of the floating piston, and it may be assisted by the pressure of the spring 45. In any event a certain amount of air will be retained in the hollow or recess 40 on the under side of the piston 39, as the movement of the floating piston causes the port 36 to be closed and so cuts off the chamber B from the chamber C. In effect the relative movement of the cylinders and pistons produces a pumping action the effect of which is to keep the chamber A supplied with air at a certain pressure.

This pressure may be varied by variation in the location of the transfer port 36 up or down, whereby it will be uncovered sooner or later, and also by the relative size of the hollow 40 in the piston head 39, the degree of pressure being variable or measured by the location of the transfer port and the size of the hollow under the piston head 39. Thus the shock absorber may be constructed in these details according to the weight to be carried or other local conditions. Hence a very efficient shock absorber is produced.

When the main spring of the vehicle is compressed and the frame approaches the axle the operation of the respective pistons is reversed, but in either event a predetermined supply or pressure of air is maintained in the compression chamber A, and the pressure so determined will not be exceeded, because while the pressure is maintained at the limit there will not be a sufficient relative movement of the piston 39 to uncover the port 36, and consequently no pumping action will take place.

I claim:

1. In a shock absorber, the combination of a casing having a pair of guides, a hollow cylinder having a head, working in each guide, a rock-shaft connected to the respective cylinders to operate the same in alternately opposite directions, a floating piston comprising a rod working through said cylinder head, having heads at its opposite ends, one head working in the hollow cylinder and the other head working in the guide beyond the head of the hollow cylinder, and means controlled by movement of the floating piston to transfer air pressure from the guide to the space within the hollow cylinder.

2. In a shock absorber, the combination of a main guide, a hollow cylinder having a head, working in said guide, a floating piston comprising a rod working through said head, and a head on each end of the rod, one head working in the hollow cylinder and the other head working in the guide beyond the head of the hollow cylinder, the rod having an air passage controlled by its movements to connect the space in the hollow cylinder with the space in the guide.

3. In a shock absorber, the combination stated in claim 2, the head working in the hollow cylinder having a recess on the side thereof adjacent the head of the cylinder.

4. In a shock absorber, the combination of a pair of guides, a pair of connected alternately-acting reciprocating cylinders in said guides, each cylinder being hollow and having a head with a gland therein, a piston-rod working through said gland, a piston on each end of the rod, one working in the hollow of the cylinder and the other working in the guide, the said rod having a passage extending to connect chambers on opposite sides of said gland, the outlet of said passage into the hollow cylinder being covered and uncovered by the gland as the cylinder reciprocates.

5. The combination stated in claim 4, the piston which works in the hollow of the cylinder having a concave face on the side toward the gland.

6. The combination stated in claim 4, the pistons on the ends of the said piston rod having cup-leathers sealing compression chambers one way in the guide and the hollow cylinder respectively.

7. In a pneumatic shock absorber, the combination of a guide, a hollow cylinder working therein, an inner piston in the hollow cylinder, forming a compression chamber and a transfer chamber in the cylinder, a rod extending from said inner piston through the head of the cylinder, an outer piston on the opposite end of the rod, forming a compression chamber in the guide between the head of the cylinder and the said outer piston, and a passage through the rod, connecting the transfer chamber and the last mentioned compression chamber at times.

8. The combination stated in claim 7, said passage being normally sealed but opened by inward movement of the piston rod.

9. The combination stated in claim 7, and an expansion spring between the head of the cylinder and said outer piston.

10. In a pneumatic shock absorber, the combination of a guide, a hollow cylinder therein having an inner compression chamber, a piston in said chamber, and means to automatically transfer compressed air from the guide to said chamber until the pressure in the chamber reaches a predetermined amount.

11. The combination stated in claim 10, said means being controlled by relative movement of the cylinder and piston.

12. In a pneumatic shock absorber, the combination of a guide, a hollow cylinder reciprocating therein, said hollow forming an inner compression chamber, a piston in said compression chamber, said guide and cylinder defining a pump-chamber, and means controlled by relative movements of the cylinder and piston to transfer air pressure from the pump chamber to the said compression chamber.

13. The combination stated in claim 12, said means including a transfer chamber between the piston and the head of the hollow cylinder.

In testimony whereof, I do affix my signature.

LUCIEN R. GRUSS.